J. H. & F. B. DAVIDHEISER.
APPARATUS FOR STRIKING OFF BRICK.
APPLICATION FILED MAY 22, 1911.
1,021,354.
Patented Mar. 26, 1912.
3 SHEETS—SHEET 1.
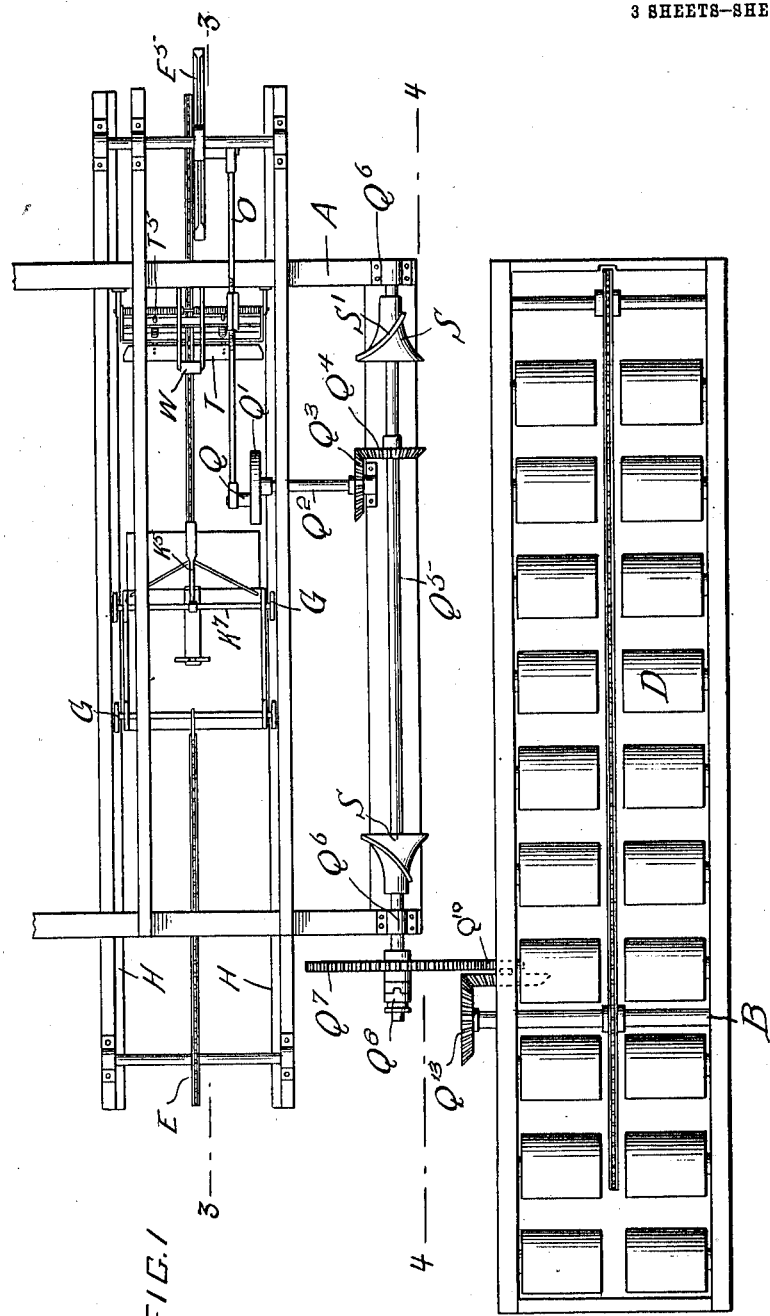

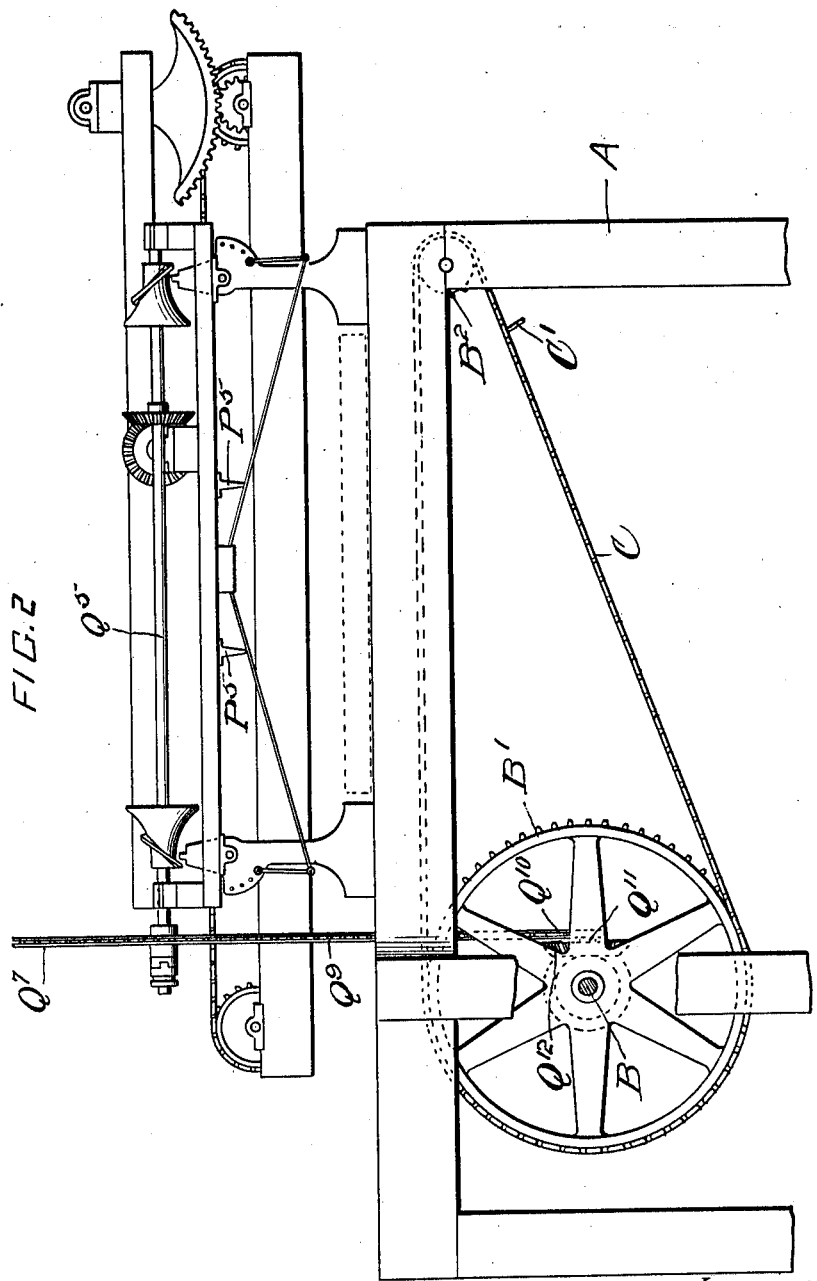

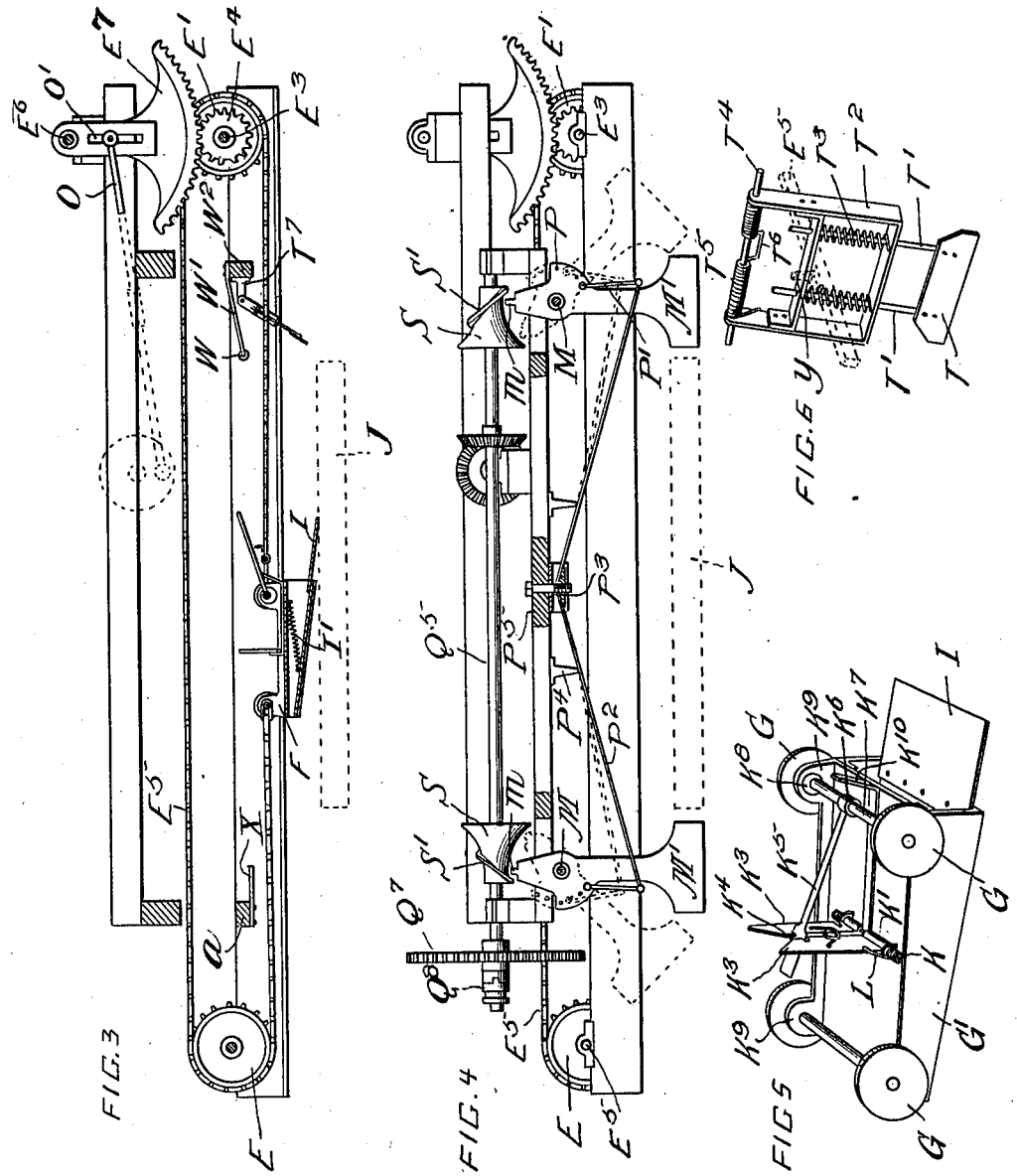

UNITED STATES PATENT OFFICE.

JOHN H. DAVIDHEISER AND FRANK B. DAVIDHEISER, OF STOWE, PENNSYLVANIA.

APPARATUS FOR STRIKING OFF BRICK.

1,021,354. Specification of Letters Patent. Patented Mar. 26, 1912.

Application filed May 22, 1911. Serial No. 628,843.

*To all whom it may concern:*

Be it known that we, JOHN H. DAVIDHEISER and FRANK B. DAVIDHEISER, citizens of the United States, residing at Stowe, in the county of Montgomery and State of Pennsylvania, have invented certain new and useful Improvements in Apparatus for Striking Off Brick; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for striking off and loosening brick in molds and comprises various details of construction and combinations and arrangements of parts which will be hereinafter fully described and then specifically defined in the appended claims.

We illustrate our invention in the accompanying drawings, in which:—

Figure 1 is a top plan view of our improved apparatus. Fig. 2 is a side elevation. Fig. 3 is a sectional view on line 3—3 of Fig. 1. Fig. 4 is a sectional view on line 4—4 of Fig. 1. Fig. 5 is a detail view of the carriage and striking off member, and Fig. 6 is a detailed perspective view of a device for cleaning the striking off blade.

Reference now being had to the details of the drawings by letter, A designates the frame of the apparatus and B is a driving shaft to which power may be applied in any suitable manner not shown. Said shaft is mounted in suitable bearings in the frame and has a sprocket wheel $B'$ fixed thereto and about which and a sprocket wheel $B^2$, also mounted in the frame, a sprocket chain C passes, having a finger $C'$ projecting therefrom and forming means whereby the molds may be moved forward upon the antifriction rollers D after the brick has been struck off and loosened from the mold in a manner which will be hereinafter described.

In the drawings sprocket wheels E and $E'$ are shown which are mounted upon the shafts $E^2$ and $E^3$ respectively, having suitable bearings upon the frame of the apparatus, and a sprocket chain $E^5$ passes about the sprocket chains $E'$ and $E^2$, the ends of which sprocket chain are fastened to a carriage F, having wheels G which travel upon the track H. Said carriage has a spring-pressed striking off plate or blade, designated by letter I, held normally at its lowest position by means of a spring $I'$, and which is adapted to scrape over the upper surface of the brick in the mold, shown in dotted lines and designated by letter J in Figs. 2 to 4 inclusive of the drawings. Mounted in the opposite side walls $G'$ of the carriage is a shaft K upon which the two plates $K^3$ are journaled, the lower end of each plate having a roll $K'$ to receive the shaft, and coiled springs L mounted upon the shaft K serve to normally hold the plates in the positions shown in Fig. 5 of the drawings, said springs serving to allow the plates to yield forward or backward. It will be noted that the plates $K^3$ are spaced apart a slight distance and provided with notches $K^4$ in their adjacent edges, adapted to receive the bar $K^5$. Said bar $K^5$ has a collar $K^6$ at one end fitting the shaft $K^7$, which latter has cams $K^8$ fitted thereto which engage circular outlined openings in the lugs $K^9$ of the carriage. Fastened to the carriage is a bar $K^{10}$, one end of which projects upward and is designed to form a stop to limit the throw of the bar $K^5$ in one direction. Fixed to the shaft $E^3$ is a gear wheel $E^4$ which is in mesh with the teeth of a rocking segment $E^7$ mounted upon the shaft $E^6$, journaled in suitable bearings upon the frame. The segment member $E^7$ is rocked by means of the pitman O, one end of which is adjustably held in the slot $O'$ formed in the shank portion of the segment $E^7$ and its other end is pivotally connected to an eccentrically mounted pin Q, shown in top plan view in Fig. 1 of the drawings, carried by the disk $Q'$ which is fastened to the shaft $Q^2$ and which has a beveled pinion $Q^3$ keyed thereto in mesh with a similar pinion $Q^4$ fastened to the shaft $Q^5$ which is journaled in the bearing $Q^6$ upon the frame. The shaft $Q^5$ has a sprocket wheel $Q^7$ loosely mounted thereon and which is adapted to engage a clutch member $Q^8$ splined to the shaft $Q^5$. A sprocket chain $Q^9$ passes about the sprocket wheel $Q^7$ and also a sprocket wheel $Q^{10}$ which is fastened to a stub shaft $Q^{11}$, shown in dotted lines in Fig. 2 of the drawings, and a gear wheel $Q^{12}$ upon the shaft $Q^{11}$ is in mesh with the gear wheel $Q^{13}$ upon the driving shaft B, thus affording means whereby power may be transmitted to the shaft $Q^5$.

Fixed to the shaft $Q^5$ are the conical shaped members S, each one of which has a spiral thread $S'$ upon its circumference, and pivotally mounted upon the shafts M are the pivotal knocker members $M'$, the upper end of each of said members having a finger $m$ positioned in the paths of the spiral threads $S'$, as shown clearly in Figs. 2 and 3 of the drawings. A laterally projecting portion of each pivotal knocker member $M'$ has a series of apertures P in which one end of a link $P'$ is adapted to be connected and each link $P'$ is in turn pivotally connected to the end of a resilient rod $P^2$, the inner end of each of which is fastened to a screw $P^3$, as shown clearly in Fig. 4 of the drawings, and each rod $P^2$ is adapted to fulcrum over a projection $P^4$ upon the under surface of the table $P^5$ when the knocker members are tilted to the positions shown in dotted lines, thus putting said rods under tension so that, after the fingers $m$ leave the ends of the spiral threads, said rods will tend to forcibly throw the knockers against the opposite ends of the mold J for the purpose of loosening the molded bricks from the walls of the molds.

In order to clean the striking off blade or plate I of any accumulation of plastic material which may adhere to the surface thereof, we provide the cleaning blade, designated by letter T, a detail perspective view of which is shown in Fig. 6 of the drawings, and which blade is provided with rods $T'$ mounted in registering apertures in the spring-pressed frame $T^2$, coiled springs $T^3$ being interposed between the parallel faces of the frame. The frame $T^2$ is mounted upon a shaft $T^4$ and is held in its normal position, shown in Fig. 3 of the drawings, by means of the spring $T^5$, the ends of which engage the frame $T^2$ and a bail-shaped portion $T^6$ thereof engages the end of the bracket $T^7$, as shown clearly in Figs. 3 and 6 of the drawings. In order to rock the frame $T^2$ for the purpose of bringing the scraper blade T in contact with the upper surface of the striking off blade, a lug Y projecting from the chain $E^5$ will come in contact with the frame as the striking off blade approaches its farthest forward limit. As the frame $T^2$ swings upon its shaft, the spring $T^5$ will be put under tension and which will tend to return the frame to its normal position after the carriage has drawn back to its starting position.

An anti-friction roller W is journaled in the bail-shaped member $W'$, the ends of which are fastened to the cross-piece $W^2$ of the frame. Referring to Fig. 3 of the drawings will be seen a stop member X which is horizontally disposed and fastened to the cross beam $a$ of the frame, and which is disposed in the path of the plates $K^3$, the purpose of said member X being to cause the plates $K^3$ to tilt to release the bar $K^5$ when the carriage approaches its farthest limit in one direction.

The operation of our apparatus is as follows:—The trays containing the molds of brick are fed laterally underneath the striking off member and assume the positions shown in dotted lines in Figs. 2 to 4 of the drawings. A rocking movement is imparted to the segment member $E^5$ through the medium of the pitman which is pivotally connected to the disk $Q'$. Said rocking movement will cause the carriage to be fed forward over the surface of the mold and the striking off blade will scrape off the upper surfaces of the molds. As the striking off blade approaches its farthest forward limit, the projection Y upon the chain $E^5$ will have come into contact with the frame carrying the spring-pressed scraper knife T and cause the frame $T^2$ upon its shaft and the edge of the member T to scrape over any plastic material which might adhere to the striking off blade. As the oscillating bar $K^5$ comes in contact with the anti-friction roller W as the carriage approaches its farthest forward limit, said bar $K^5$ will be rocked upon its shaft and thrown to the position shown in Fig. 5 of the drawings, in which position the axle carrying the cams $K^8$ will have been given a partial rotary movement, sufficient to raise the striking off member a slight distance above the surface of the brick which it has struck off in its forward movement. This provision is made to allow the striking off member to return to a striking position without interference with the mold or surface of the brick which has been struck off. When the carriage approaches its limit in the opposite direction, the stop X will come in contact with the plates $K^3$ and cause the same to swing downward and release the member $K^5$, allowing the latter to return to its normal position by gravity. As the shaft $Q^5$ rotates, the conical shaped members S, fixed to the shaft K, will cause the knocker members $M'$ to tilt upon its pivots and, as they tilt to the position shown in dotted lines in Fig. 4, the resilient rods $P^2$, which are connected to the members M through the link connections shown, will be under tension and, when the spiral threads $S'$ clear the lugs $m$, said resilient rods will cause the knocker members $M'$ to swing and strike against the ends of the mold and which will have a tendency to loosen the brick therefrom so that they may be easily delivered from the molds. As each tray containing the molds has been acted upon in the manner described by our apparatus, it is pushed laterally by a succeeding mold upon the rollers D and conveyed away.

What we claim to be new is:—

1. An apparatus for striking off brick comprising a frame, sprocket wheels mounted thereon, an endless chain passing about said wheels, a carriage secured to said chain, shafts mounted in said carriage, eccentrics mounted in bearings in the carriage and fixed to one of said shafts, tracks upon which said wheels travel, means for actuating said chain to impart a reciprocating movement to the carriage, a striking off plate fastened to said carriage, an oscillating bar secured to the shaft, which is fixed to said eccentrics, means in the path of said bar adapted to oscillate the latter to rock the shaft, thereby causing the striking off plate to be raised as it approaches its forward limit, and means for oscillating the bar in the opposite direction as the carriage approaches its rearward limit to return the plate to its normal position.

2. An apparatus for striking off brick comprising a frame, sprocket wheels mounted thereon, an endless chain passing about said wheels, a carriage secured to said chain, shafts mounted in said carriage, eccentrics mounted in bearings in the carriage and fixed to one of said shafts, tracks upon which said wheels travel, means for actuating said chain to impart a reciprocating movement to the carriage, a striking off plate fastened to said carriage, an oscillating bar secured to the shaft, which is fixed to said eccentrics, an anti-friction roller, a support to hold the latter in the path of said bar to cause the latter to oscillate as it reaches its forward limit, a stop against which the bar is adapted to contact as it reaches its rearward limit, thereby causing the striking off plate to be returned to its normal position.

3. An apparatus for striking off brick comprising a frame, sprocket wheels mounted thereon, an endless chain passing about said wheels, a carriage secured to said chain, shafts mounted in said carriage, eccentrics mounted in bearings in the carriage and fixed to one of said shafts, tracks upon which said wheels travel, means for actuating said chain to impart a reciprocating movement to the carriage, a striking off plate fastened to said carriage, an oscillating bar secured to the shaft, which is fixed to said eccentrics, an anti-friction roller, a support to hold the latter in the path of said bar to cause the latter to oscillate as it reaches its forward limit, pivotal plates mounted upon the carriage, springs bearing against each plate, the plates being spaced apart and adapted to receive and hold the bar after having been oscillated by contact with said roller, and a stop against which the bar is adapted to contact as the carriage reaches its rearward limit, thereby releasing the bar from said plates.

4. An apparatus for striking off brick comprising a frame, sprocket wheels mounted thereon, an endless chain passing about said wheels, a carriage secured to said chain, shafts mounted in said carriage, eccentrics mounted in bearings in the carriage and fixed to one of said shafts, tracks upon which said wheels travel, means for actuating said chain to impart a reciprocating movement to the carriage, a striking off plate fastened to said carriage, an oscillating bar secured to the shaft, which is fixed to said eccentrics, an anti-friction roller, a support to hold the latter in the path of said bar to cause the latter to oscillate as it reaches its forward limit, a cross-piece upon the frame, a scraper pivotally mounted thereon, pivotally mounted, spring-actuated plates upon the carriage and spaced apart and adapted to receive and hold the bar as it is swung to its limit by said roller, and means for releasing the bar as the carriage approaches its rearward limit.

5. An apparatus for striking off brick comprising a frame, sprocket wheels mounted thereon, an endless chain passing about said wheels, a carriage secured to said chain, shafts mounted in said carriage, eccentrics mounted in bearings in the carriage and fixed to one of said shafts, tracks upon which said wheels travel, means for actuating said chain to impart a reciprocating movement to the carriage, a striking off plate fastened to said carriage, an oscillating bar secured to the shaft, which is fixed to said eccentrics, an anti-friction roller, a support to hold the latter in the path of said bar to cause the latter to oscillate as it reaches its forward limit, a cross-piece upon the frame, a pivotal frame mounted upon said cross-piece, a spring-pressed scraper mounted upon said pivotal frame, a lug upon the endless chain adapted to contact with the pivotal frame to cause the scraper to tilt as the carriage approaches its forward limit, spring-actuated pivotal plates upon the carriage adapted to receive and hold the bar as it is oscillated by said roller, and a stop against which the bar is adapted to contact as the carriage reaches its rearward limit.

In testimony whereof we hereunto affix our signatures in the presence of two witnesses.

JOHN H. DAVIDHEISER.
FRANK B. DAVIDHEISER.

Witnesses:
A. L. HOUGH,
FRANKLIN H. HOUGH.

Copies of this patent may be obtained for five cents each, by addressing the "Commissioner of Patents, Washington, D. C."